United States Patent
Tsuchiya et al.

(10) Patent No.: US 9,214,871 B2
(45) Date of Patent: Dec. 15, 2015

(54) POWER CONVERSION DEVICE WITH A DAISY CHAIN CONFIGURATION COMMUNICATION CONTROL UNIT

(75) Inventors: Mitsuyoshi Tsuchiya, Hitachinaka (JP); Shigenori Inoue, Hitachi (JP); Tetsuya Kato, Hitachiota (JP); Tadashi Sodeyama, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 188 days.

(21) Appl. No.: 13/882,613

(22) PCT Filed: Oct. 25, 2011

(86) PCT No.: PCT/JP2011/074523
§ 371 (c)(1),
(2), (4) Date: Apr. 30, 2013

(87) PCT Pub. No.: WO2012/060250
PCT Pub. Date: May 10, 2012

(65) Prior Publication Data
US 2013/0223115 A1    Aug. 29, 2013

(30) Foreign Application Priority Data

Nov. 1, 2010  (JP) .................................. 2010-244884

(51) Int. Cl.
*H02M 7/217* (2006.01)
*H02M 7/49* (2007.01)
(Continued)

(52) U.S. Cl.
CPC ............ *H02M 7/217* (2013.01); *H02M 1/0845* (2013.01); *H02M 7/49* (2013.01); *H02J 3/1857* (2013.01); *H02M 2007/4835* (2013.01); *Y02E 40/26* (2013.01)

(58) Field of Classification Search
CPC ............... H02M 2001/007; H02M 2001/0012; H02M 1/14; H02M 1/143; H02M 2003/1586; H02M 3/157; H02M 3/158; H02M 3/1584; H02M 3/1588; H02M 7/19; H02M 7/48; H02M 7/493; H02J 1/02

USPC ............ 363/35, 36, 37, 65, 67, 68, 69, 70, 71, 363/131, 132
See application file for complete search history.

(56) References Cited

U.S. PATENT DOCUMENTS 7,412,612 B2 *  8/2008  Maple et al. .................. 713/320
7,933,132 B2 *  4/2011  Bridge ................ H02M 3/1584
                                                    363/65

(Continued)

FOREIGN PATENT DOCUMENTS

JP    H11-074884      3/1999
JP    2002-345252 A  11/2002

(Continued)

OTHER PUBLICATIONS

Hagiwara et al., "PWM Control and Experiment of Modular Multilevel Converters," The transactions of the Institute of Electrical Engineers of Japan, Jul. 1, 2008, Industry Applications Society 128(7), pp. 957-965.

(Continued)

*Primary Examiner* — Adolf Berhane
*Assistant Examiner* — Jye-June Lee
(74) *Attorney, Agent, or Firm* — Crowell & Moring LLP

(57) ABSTRACT

A power conversion device includes: a plurality of cascade-connection type single-phase power converters; and a central control unit that controls the plurality of the single-phase power converters, wherein each of the plurality of single-phase power converters has a single-phase power converter control unit, and the central control unit and the plurality of the single-phase power converter control units are connected via a communication means having a daisy-chain configuration, wherein the single-phase power converter control unit transmits and receives a control signal via the communication means having the daisy-chain configuration, as well as a specific pattern signal, other than a control signal frame, which can be distinguished from the control signal frame, and determines a communication error due to not receiving the specific pattern signal at the single-phase power converter control unit, or an inconsistency between the received signal and the specific pattern signal.

11 Claims, 6 Drawing Sheets

(51) Int. Cl.
*H02M 1/084* (2006.01)
*H02J 3/18* (2006.01)
*H02M 7/483* (2007.01)

(56) References Cited

U.S. PATENT DOCUMENTS

| | | | |
|---|---|---|---|
| 8,558,524 B2* | 10/2013 | Carroll | H02M 3/1584 323/272 |
| 8,817,503 B2* | 8/2014 | Inoue | H02M 7/12 363/127 |
| 2004/0208029 A1* | 10/2004 | Caruthers et al. | 363/72 |
| 2004/0240237 A1 | 12/2004 | Okayama et al. | |
| 2013/0293013 A1* | 11/2013 | Templeton | G06F 1/266 307/64 |
| 2013/0294530 A1* | 11/2013 | Martin | G06F 13/4247 375/257 |
| 2014/0365792 A1* | 12/2014 | Yun | G06F 1/3212 713/320 |

FOREIGN PATENT DOCUMENTS

| | | |
|---|---|---|
| JP | 2004-357427 A | 12/2004 |
| JP | 2006-42426 A | 2/2006 |
| JP | 2007-280358 A | 10/2007 |

OTHER PUBLICATIONS

International Search Report with English translation dated Jan. 31, 2012 (four (4) pages).
Form PCT/ISA/237 dated Jan. 31, 2012 (three (3) pages).

* cited by examiner

POWER CONVERSION DEVICE WITH A DAISY CHAIN CONFIGURATION COMMUNICATION CONTROL UNIT

CROSS REFERENCE TO RELATED APPLICATION

The present application claims benefit of the filing date of PCT Application No. PCT/JP2011/074523 filed on Oct. 25, 2011 which is incorporated herein by reference.

TECHNICAL FIELD

The present invention relates to a power conversion device, and a control and communication device as well as a communication error detecting method, both of which are used for the power conversion device.

BACKGROUND OF INVENTION

In recent years, the introduction of distributed power sources, typified by a solar power generation, into the power distribution system has been actively promoted, but as a result, increasing voltage variation of the power distribution system is becoming a problem. It is effective to apply a reactive power compensator for improving the stability of such a power distribution system, and in particular, application of a cascade-connection type SVC (Static Var Compensator) is proposed.

In Japanese Patent Application JP2007-280358A, a technique of a cascade-connection type SVC is disclosed, wherein single-phase power converters, having N units per phase, are serially connected at the AC side and configured to be capable of outputting multi-level voltages.

When the single-phase power converters (hereinafter, referred to "cells" as appropriate) are controlled by a PWM (Pulse Width Modulation) method, and if a phase of a triangular carrier wave to be supplied to each of the cells is shifted properly, it is possible for output power waveforms of the SVCs to approximate sine waves at multi-levels, thereby suppressing harmonic components.

In Japanese Patent Application JP2002-345252A, an operation method is disclosed, wherein, in order to control a plurality of cells by a PWM method, by constituting a distributed control system consisting of: a central control unit installed in a position at a distance from the cells; and cell control units installed in the vicinity of each of the cells, and by including a PWM synchronization signal, as well as a voltage command value and a PWM pattern command, in a signal to be transmitted from the master to the slaves, a PWM generator is reset every time the synchronization signal is outputted.

SUMMARY OF INVENTION

Problems to be Solved

However, as a potential of each of the cells is different from one another in the cascade-connection type SVC and some cells may have high ground potentials, the central control unit at the grounded potential and each of the cell control units need to be connected with a special optical fiber cable provided with a dielectric strength to withstand the potential difference between the two.

Further, as there is a possibility of a communication error such as a cable short circuit due to insulation deterioration, a feature to detect such a communication error need to be also provided. However, there is a problem that the number of bits of the control signal frame increases when the communication error detection feature is incorporated into the control signal frame, and it takes longer time.

An optical fiber cable having a dielectric strength is more expensive as an insulation performance increases. Therefore, it is assumed to shorten the length of the optical fiber cable requiring high insulation performance in the entire system, by connecting the central control unit and each of the cell control units with a daisy chain through the optical communication means.

With the daisy chain connection, as the control signal frame transmitted from the central control unit includes the information for controlling all the cells, it takes longer time for the control signal frame, thus revealing the aforesaid problem notably.

Accordingly, the present invention is intended to solve these problems, with the purpose of providing a power converter configured to perform error detection at low cost and easily for inability to transmit from the control unit of each of the single-phase power converters, communication interruptions due to disconnection or short circuit of the optical fiber cable, or the like.

Means for Solving Problems

In order to solve the aforesaid problems and attain the purpose of the present invention, a configuration is made as follows.

That is, a power conversion device includes: a plurality of cascade-connection type single-phase power converters; and a first control unit that controls the plurality of single-phase power converters, wherein each of the plurality of the single-phase power converters has a second control unit, and the first control unit and the plurality of the second control units are connected via a communication means having a daisy-chain configuration, wherein the second control unit transmits and receives a control signal via the communication means having the daisy-chain configuration, as well as a specific pattern signal, other than a control signal frame, which can be distinguished from the control signal frame, and determines a communication error due to not receiving the specific pattern signal at the second control unit, or an inconsistency between the received signal and the specific pattern signal.

Effects of Invention

According to the present invention, it is possible to provide a power converter configured to perform error detection at low cost and easily for inability to transmit from the control unit of each of the single-phase power converter, communication interruptions due to disconnection or short circuit of the optical fiber cable, or the like.

BRIEF DESCRIPTION OF DRAWINGS

FIG. 7A shows a schematic configuration of a modular multilevel converter and FIG. 7B shows a circuit configuration of a cell used in FIG. 7A.

EMBODIMENTS OF INVENTION

Hereinafter, embodiments for implementing the present invention will be described with reference to drawings.

First Embodiment

A first embodiment of the present invention will be described with reference to FIGS. 1 to 3.

Figure 1:
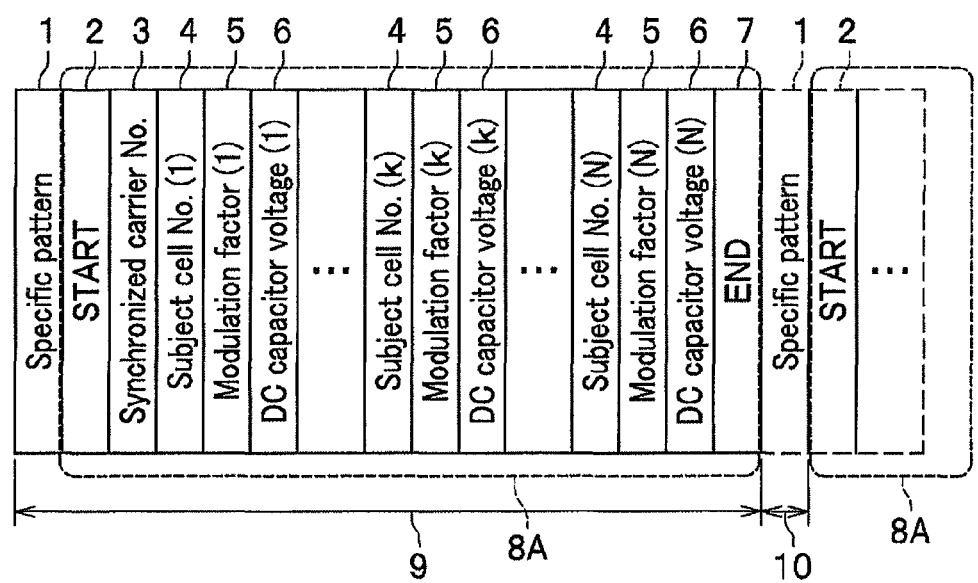
FIG. 1 is a diagram showing a configuration of an optical serial signal frame provided with a control signal and a specific pattern signal of a first embodiment of the present invention.

FIG. 1 is a diagram showing a configuration of an optical serial signal frame provided with a control signal and a specific pattern signal used for the first embodiment of the present invention.

Figure 2:
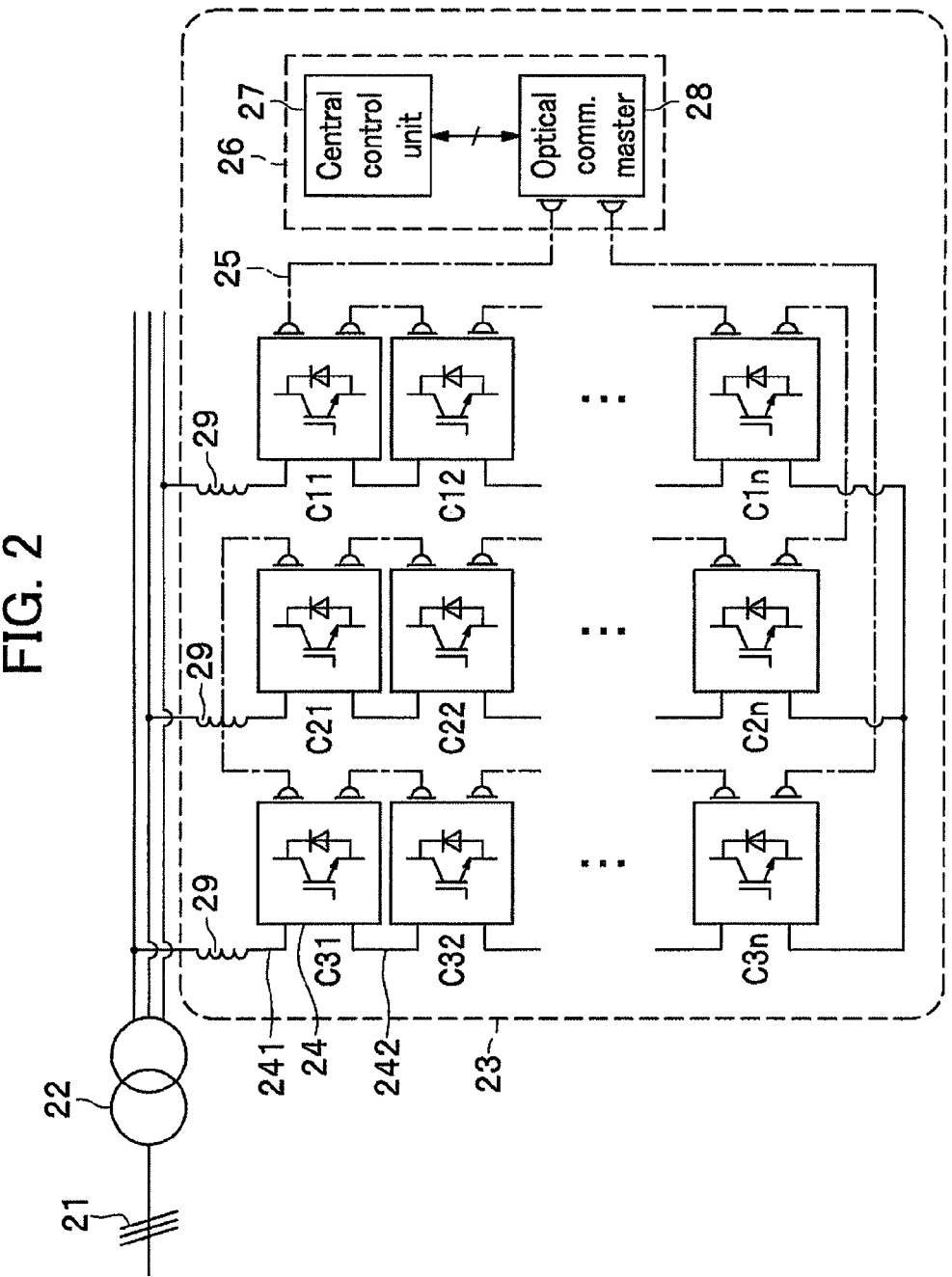
FIG. 2 is a diagram showing a circuit configuration of a cascade-connection type SVC according to the first embodiment of the present invention.
Figure 3:
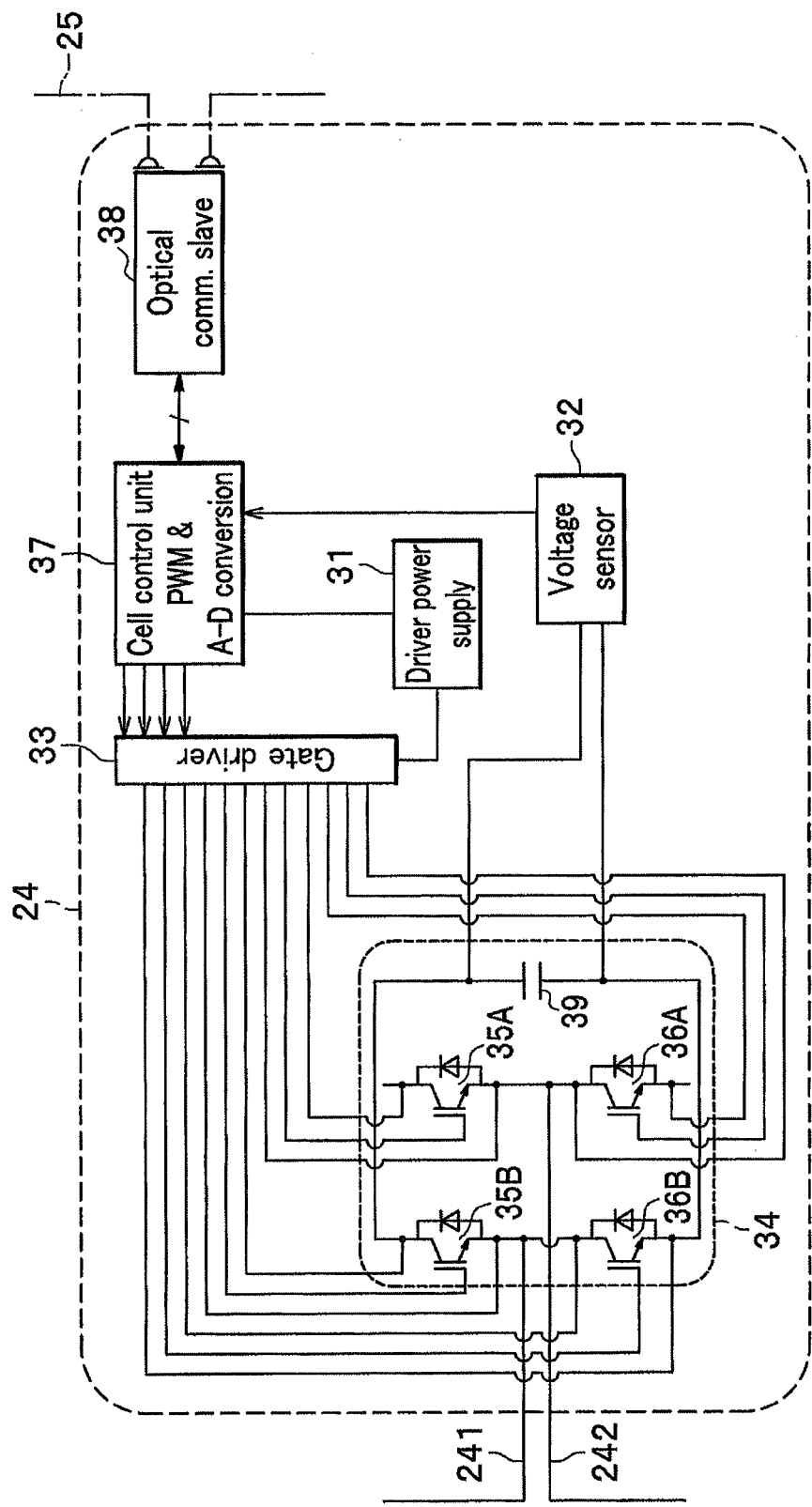
FIG. 3 is a diagram showing a circuit configuration of a single-phase power converter (cell) in the cascade-connection type SVC according to the first embodiment of the present invention.

FIGS. 2 and 3 are diagrams showing circuit configurations of a cascade-connection type SVC which is a power conversion device that applies the optical serial signal frame used in the first embodiment of the present invention.

A feature of the first embodiment of the present invention is in the configuration of an optical serial signal frame provided with a control signal and a specific pattern signal in FIG. 1, but for the purpose of easy understanding why such a configuration of a signal frame is being applied, a circuit configuration of a power conversion device that applies an optical serial signal frame used in the first embodiment of the present invention will be described first with reference to FIGS. 2 and 3, then the configuration of the optical serial signal frame in FIG. 1 will be described.

Circuit Configuration of Power Conversion Device

In FIG. 2, the power conversion device according to the first embodiment (cascade-connection type Static Var Compensator) 23 is interconnected to a three-phase power system 21 via a transformer 22, and an AC power is transferred between the two (21 and 23). Each converter arm of the power conversion device 23 is configured with cascade-connection of cells 24 which are a plurality of single-phase power converters.

That is, a first converter arm has cells C11-C1$n$ cascade-connected, a second converter arm has cells C21-C2$n$ cascade-connected, and a third converter arm has cells C31-C3$n$ cascade-connected, thereby constituting a three-phase converter arm out of the first to third converter arms.

In addition, one end of each of the first to third converter arms is connected to the secondary side of the transformer 22 via an AC reactor 29. The other end of each of the first to third converter arms is commonly connected.

It should be noted that the circuit configuration of the power conversion device 23 in FIG. 2 is called a Cascade-Multilevel Converter (CMC).

A central control unit (first control unit) 26 is configured to include a central controller 27 and an optical communication master 28, for controlling the power conversion device 23.

As will be described later, each cell 24 of a plurality of single-phase power converters includes a cell control unit (second control unit, or single-phase power converter control unit) 37 (FIG. 3) and an optical communication slave 38 (FIG. 3).

The central control unit 26 transmits an optical serial signal (frame) to the optical communication slave 38 (FIG. 3) of each cell 24 via an optical fiber cable 25, by the central controller 27 and the optical communication master 28, and receives a signal from the optical communication slave 38 (FIG. 3) of each cell 24.

However, it does not mean that the optical communication master 28 and an optical communication slave 38 (FIG. 3) of each cell 24 are directly connected via an optical fiber cable 25. It will be described below what configuration is used for connecting the two.

In FIG. 2, the optical communication master 28 is connected to the cell C11 of a cell 24 via the optical fiber cable 25, the cell C11 is connected to the cell C12 via the optical fiber cable (25), and likewise cells are connected in series up to the cell C1$n$, which is a terminal of the first converter arm, via the optical fiber cable (25).

Further, the cell C2$n$, which is a terminal of the second converter arm, is connected to the cell C1$n$ via the optical fiber cable (25), and the cell C2$n$ up to the first cell C21 of the second converter arm are sequentially connected in series via the optical fiber cable (25).

Furthermore, the cell C31, which is a first cell of the third converter arm, is connected to the cell C21 via the optical fiber cable (25), and the cell C31 up to the cell C3$n$, which is a terminal of the third converter arm, are sequentially connected in series via the optical fiber cable (25).

Lastly, the cell C3$n$ is connected to the optical communication master 28 via the optical fiber cable (25).

As shown above, by the optical communication master 28 of the central control unit 26 controlling the optical communication slaves 38 (FIG. 3) of the plurality of the cells 24, the central control unit 26 and the cells 24 of a plurality of single-phase power converters relationally constitute a daisy chain.

It should be noted that the central control unit 26 as well as the neutral point of the secondary side of the transformer 22 are generally configured to have the grounded potential, but not necessarily.

Circuit Configuration of Cell/Single-Phase Power Converter

FIG. 3 is a diagram showing a circuit configuration of a cell 24 of a single-phase power converter.

In FIG. 3, a main circuit 34 as a single-phase power converter is a full-bridge circuit configured with switching elements 35A, 35B, 36A and 36B, each of which is composed of an IGBT (Insulated Gate Bipolar Transistor). In addition, a DC capacitor 39 is provided in the main circuit 34.

By turning on/off switching elements 35A, 35B, 36A, 36B, an AC voltage which the cell 24 of a single-phase power converter is in charge thereof is outputted across a first and second terminals 241, 242 of the main circuit 34 having a full-bridge configuration.

The cell control unit 37 generates a pulse (gate pulse) of the control signal which turns on/off the switching elements 35A, 35B, 36A, 36B of the main circuit 34. In the cell control unit 37, a digital signal which has been converted into a PWM pulse is outputted, by comparing a modulation waveform of a sine wave with a carrier signal of a triangular wave (triangular carrier wave). That is, functions of an A/D (Analog/Digital) conversion and a PWM conversion are provided.

In response to signals from the cell control unit 37, the gate driver 33 controls the switching elements 35A, 35B, 36A, 36B of the main circuit 34.

In addition, the driver power supply 31 supplies power to the gate driver 33 and the cell control unit 37.

Further, by detecting a voltage across the DC capacitor 39 of the main circuit 34, a voltage sensor 32 sends a detected signal to the cell control unit 37. The cell control unit 37 transmits the information from the voltage sensor 32 as an item of a DC capacitor voltage 6 (FIG. 1) in the control signal frame 8A (FIG. 1) included in the optical serial signal frame, that will be described later, via the optical communication slave 38.

The optical communication slave 38 receives optical serial signals (frames) transmitted from the optical communication master 28 of the central control unit 26, via the optical fiber cable 25. As well as transmitting control signals contained in the optical serial signals (frames) to the cell control unit 37, the optical communication slave 38 receives signals indicating the state of the cell control unit 37, as described above. Then, the optical communication slave 38 transmits the information to other cells (24) or the central control unit 26, via the optical fiber cable 25.

As described above, by the cells 24 of the plurality of single-phase power converters (C11-C1$n$, C21-C2$n$, C31-C3$n$) operating in collaboration under the control of the central control unit 26, the power conversion device 23 behaves as a reactive power compensator.

Configuration of Optical Serial Signal Frame

As described above, FIG. 1 is a diagram showing a configuration of an optical serial signal frame.

A signal transmitted from the central control unit 26 (FIG. 2) to the cell control unit 37 (FIG. 2) is configured with an optical serial signal frame. An optical serial signal frame is configured to include a control signal frame 8A and a specific pattern 1.

In FIG. 1, the control signal frame 8A, for instance, includes: a signal start mark (START) 2; a synchronized carrier number 3; a subject cell number (Subject cell number) 4, a modulation factor for each cell (Modulation factor) 5; a voltage signal of each DC capacitor or dummy voltage information (DC capacitor voltage) 6; and a signal end mark (END) 7.

Here, each of the items (2-7) included in the control signal frame 8A above is expressed in FIG. 1, in the words indicated in parentheses as described above. In addition, as (1–k–N) pieces are present for each of the items above, a suffix number is appended in sequence to each of the items.

Further, the control signal frame 8A and the specific pattern 1 are transmitted from the central control unit 26 at a substantially constant frequency.

<<Normal Communication Case>>

In the case the communication is normal, each cell control unit 37 (FIG. 3) or each cell 24 (FIG. 2) behaves as follows, with the control signal frame 8A in FIG. 1.

Assuming that a cell 24 (FIG. 2) which receives a control signal at the k-th order from the central control unit 26 (FIG. 2) is the k-th cell, the k-th cell retrieves the modulation factor 5 for itself, by referencing to the subject cell number 4 of the control signal frame 8A received from the (k−1)-th cell.

Further, the k-th cell generates a new control signal frame 8A, by replacing the dummy information of the DC capacitor (DC capacitor voltage 6) with the actual DC capacitor voltage signal of its own, and transmits the new control signal frame 8A to the (k+1)-th cell.

It should be noted that the main circuit (34, FIG. 3) of the k-th cell (24, FIG. 3) is operated with the retrieved modulation factor 5. The voltage of the DC capacitor (39, FIG. 3) is detected by the voltage sensor (32, FIG. 3) as described above.

Further, if the synchronized carrier number 3 received from the (k−1)-th cell and the carrier number of its own are consistent, the triangular carrier wave generated by itself is forcibly reset to a predetermined value, when duration of a cell-dependent adjustment time (time to approximately align the signal transmission delay time from the central control unit 26 to each of the cells C11-C1$n$, C21-C2$n$, C31-C3$n$) is elapsed since the signal end mark (END 7) was received.

As described above, using the control signal frame 8A in FIG. 1, a control signal composed of an optical serial signal frame is transmitted from the optical communication master (28, FIG. 2) of the central control unit (26, FIG. 2) to each of the cell control units (37, FIG. 3) via each of the optical communication slaves (38, FIG. 3) of each of the cells (C11-C1$n$, C21-C2$n$, C31-C3$n$, FIG. 2). By transmitting and receiving control signals of the control signal frame 8A, each of the cells (C11-C1$n$, C21-C2$n$, C31-C3$n$, FIG. 2) which is a single-phase power converter, operates integrally in collaboration. Thus the power converter (23, FIG. 2) works.

<<Communication Error Detection>>

As a cause that an optical serial signal frame is not transmitted correctly to the cell controller 37, a communication error due to disconnection of the optical fiber cable 25 or a failure at a transceiver (not shown) in the optical communication slave 38 is possible.

In case of the circuit configuration in FIG. 2, since the potential of each of the cells 24 is different from one another, it is necessary that the optical fiber cable 25 has a dielectric strength to withstand the potential difference between each of the cells 24 with one another or between each of the cells and the central control unit 26, and the possibility of not only disconnection but also short circuit due to insulation degradation must be considered.

Figure 6:
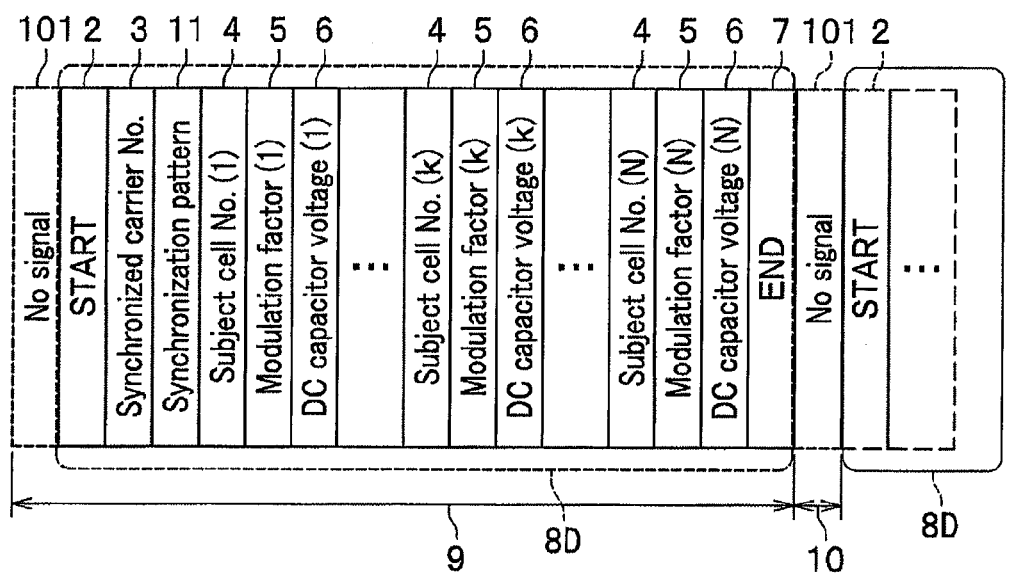
FIG. 6 is a diagram showing the configuration of an optical serial signal frame as a comparative reference.

The control signal frame 8D in FIG. 6, shown for reference, includes a synchronization pattern 11, wherein it is assumed that, due to not receiving a synchronization pattern 11 or inconsistency therebetween, a communication error of out-of-sync such as inability to transmit from the previous cell and disconnection of the optical fiber cable 25 (FIG. 2) has occurred.

However, the synchronization pattern 11 caused a long transmission time (sync time), as well as long control signal frame 8D.

Therefore, as shown in FIG. 1, a specific signal pattern 1 is included during the time other than the control signal frame 8A, instead of the synchronization pattern 11 (FIG. 6), and if a specific pattern 1 is not received or there is an inconsistency between the received signal and the specific pattern 1, it is determined that a communication error due to out-of-sync has occurred.

It should be noted that a specific pattern 1 is a predetermined pattern which can be distinguished from the control signal frame 8A.

In this way, by inserting a specific pattern 1 between the control signal frames 8A, which time was originally unused, and verifying the synchronization deviation therewith, it is possible to shorten the time length of the control signal frame 8A.

FIG. 1 shows a case where there is one control signal frame 8A per one control cycle, but there may be multiple control signal frames 8A per one control cycle and more effects are expected from applying the present invention.

Further, as signals of the specific patter 1 are transmitted and received during the time when there is no control signal frame 8A, some signals are always in communication, thereby having an advantage that out-of-sync becomes less likely to occur.

Second Embodiment

Figure 4:
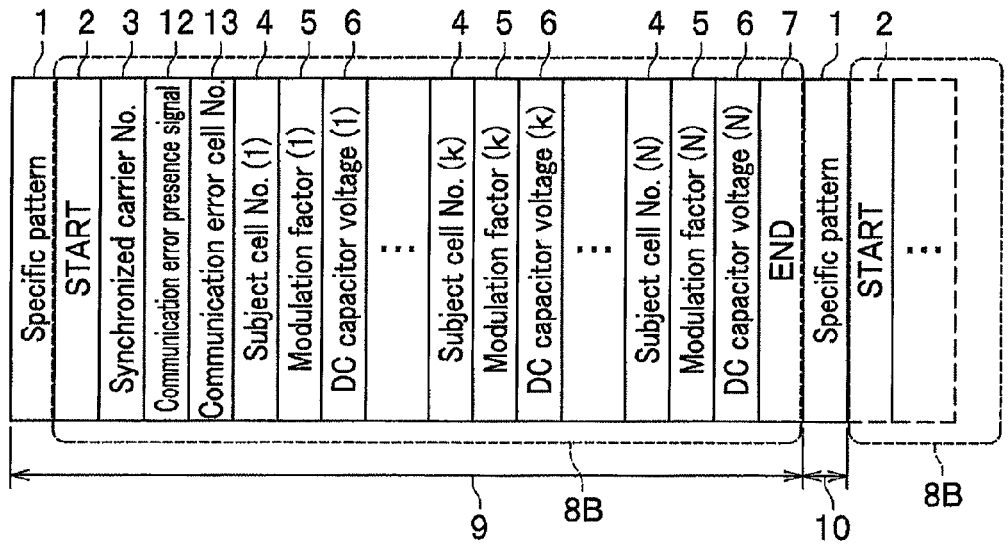
FIG. 4 is a diagram showing a configuration of an optical serial signal frame including a signal indicating presence or absence of a communication error in upstream cells and a communication error cell number according to a second embodiment of the present invention.

Next, a second embodiment of the present invention will be described. An optical serial signal frame and a control signal frame 8B included therein in the second embodiment are shown in FIG. 4, and there are various methods to use the control signal frame 8B (FIG. 4). Then, a first and second usages of the second embodiment will be described in this order.

First Usage of Second Embodiment

FIG. 4 is a diagram showing a configuration of an optical serial signal frame in which a signal indicating presence or absence of a communication error at upstream cells (communication error presence signal) 12 and a communication error cell number 13 are added to the control signal frame 8A (FIG. 1) that is shown in the first embodiment and does not include the synchronization pattern.

In FIG. 4, when an error occurs in the cells 24 (C11-C1$n$, C21-C2$n$, C31-C3$n$, FIG. 2), the presence of an error (communication error presence signal 12) and the error cell number (communication error cell number 13) are recorded as common information, whatever the error is, with the communication error presence signal 12 and the communication error cell number 13.

It should be noted that the communication error presence signal 12 and the communication error cell number 13 are collectively referred to as a communication error diagnostic information signal, as appropriate.

When detecting a communication error at the k-th cell, due to not receiving a specific pattern 1 or inconsistency between the received signal and the specific pattern 1, it is determined that there is a communication error since the transmission from the (k−1) cell until the reception at the k-th cell, then the communication error presence signal 12 is indicated as a communication error is present at an upstream cell, and further the communication error cell number 13 is updated with a signal indicating the (k−1)-th cell in place of dummy information, thereby generating a new control signal frame.

And the new control signal frame is transmitted to the (k+1)-th cell.

At the (k+1)-th cell and beyond, the communication error presence signal 12 indicating the presence of the error at the upstream cell and the communication error cell number 13 are transmitted to the next cell as they are, regardless of the communication error detection result for the specific pattern 1.

In this way, the central control unit 26 finally receives signals indicating "a communication error is present" and "its cell number", and it is possible to transmit a signal to turn off switching elements (35A, 35B, 36A, 36B, FIG. 3) for device protection, based on the information above, to each of the cells 24, or clarify a portion to be repaired, in some way, in an output visible to an user.

Second Usage of Second Embodiment

Next, a second usage of the second embodiment will be described. As in the first usage of the second embodiment, the control signal frame 8B in the second usage of the second embodiment is the configuration shown in FIG. 4.

In the first usage of the second embodiment, the communication error presence signal 12 indicating the presence of an error at an upstream cell and the communication error cell number 13 were made to have the same signals, regardless of the communication error detection result for the specific pattern 1 at the (k+1)-th cell and beyond.

However, in the second usage of the second embodiment, by rendering a specific pattern 1 of a new control signal frame to be transmitted from the k-th cell same as the specific pattern 1 to be transmitted when there is no communication error, a communication error detected at the (k+1)-th cell and beyond due to not receiving the specific pattern 1 or inconsistency thereof is assumed to be included in the communication error cell number 13.

That is, at the k-th cell, signals other than the communication error presence signal 12 indicating the presence of an error at an upstream cell and the communication error cell number 13 are transmitted as if there was no communication error virtually. Then, when detecting a new communication error due to not receiving the special pattern 1 or inconsistency thereof, it is possible to transmit all cell numbers having a communication error to the central control unit 26 (FIG. 1), by independently including information of the cell number currently in error into the information that has been transmitted as the communication error cell number 13, therefore it is very useful when multiple cells 24 or optical fiber cables 25 fail at the same time.

The abovementioned method need to increase the number of bits allocated to the communication error cell number 13 as the number of cells (24, FIG. 1) is increased, therefore when the number of cells (24, FIG. 2) is large, there is a concern that the time lengths of the control signal frames 8A (FIG. 1) and 8B (FIG. 4) become longer, but even therewith the time lengths of the control signal frames 8A and 8B become shortened as compared to that according to the method in FIG. 6, which will be described later, because detection of a communication error is performed by utilizing the specific pattern 1 which is not included in the control signal frames 8A and 8B, thereby having higher possibility of being implemented even for a case when a control cycle time 9 is short.

Third Embodiment

Next, a third embodiment of the present invention will be described.

Figure 5:
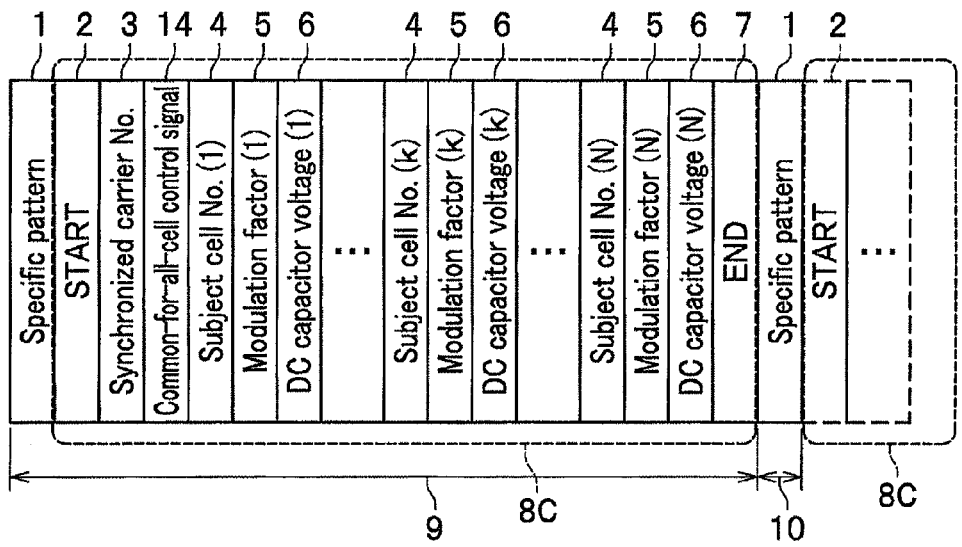
FIG. 5 is a diagram showing a configuration of an optical serial signal frame including a common-for-all-cell control signal according to a third embodiment of the present invention.

FIG. 5 is a diagram showing a configuration of an optical serial signal frame including a common-for-all-cell control signal 14 in the third embodiment.

The control signal frame 8C in FIG. 5 is obtained by including the common-for-all-cell control signal 14 into the control signal frame 8A that does not contain a synchronization pattern shown in the first embodiment. A specific pattern 1 is provided between pluralities of the control signal frames 8C.

At the k-th cell, when a communication error due to not receiving the specific pattern 1 or inconsistency between the received signal and the specific pattern 1 is detected, the control signal is set to turn off the switching elements (35A, 35B, 36A, 36B, FIG. 3) of each of the cells (24, FIG. 2) in the common-for-all-cell control signal 14, and a new control signal frame is generated, then the new control signal frame is transmitted to the (k+1)-th cell.

Further, all switching elements (35A, 35B, 36A, 36B, FIG. 3) of its own (the k-th cell) are turned off. At the (k+1)-th cell and beyond, by receiving the common-for-all-cell control signal 14 including a control signal to turn off switching elements (35A, 35B, 36A, 36B, FIG. 3), control to turn off all switching elements (35A, 35B, 36A, 36B, FIG. 3) of its own is executed, and the control signal frame 8C is transmitted to the next cell as it is.

As a result, at the cells from the k-th cell up to the N-th cell, all switching elements (35A, 35B, 36A, 36B, FIG. 3) are turned off.

In addition, the central control unit 26 (FIG. 2), which received the common-for-all-cell control signal 14 including the control signal to turn off switching elements (35A, 35B, 36A, 36B, FIG. 3) from the N-th cell, also transmits the common-for-all-cell control signal 14 portion to the first cell as it is.

As well as the k-th cell through the N-th cell, the first cell through the (k−1)-th cell executes the control to turn off all switching elements of its own, by receiving the common-for-all-cell control signal 14 including a control signal to turn off the switching elements, then transmits the control signal frame 8C to the next cell as it is.

Thus, once the control signal frame 8C is transmitted up to the (k−1)-th cell, all switching elements (35A, 35B, 36A, 36B, FIG. 3) are turned off, and thereby it is possible to protect the device (power conversion device 23, FIG. 2).

In the present embodiment, as the specific pattern 1 is used for turning off all switching elements, the synchronization pattern 11 (FIG. 6) is not required. Therefore, as the synchronization pattern 11 (FIG. 6) is not included in the control signal frame 8C, it is possible to transmit a signal for turning off all switching elements (35A, 35B, 36A, 36B, FIG. 3) to all cells 24 (C11-C1n, C21-C2n, C31-C3n, FIG. 2) in a short time, as compared to the method in FIG. 6 as a comparison reference, which will be described later. In other words, there is an effect that will enable protection of the device (power conversion device 23) in a short period of time since detecting a communication error.

Other Embodiments

It should be noted that a circuit configuration assuming a Static Var Compensator is shown in the first embodiment of the present invention, but the scope of the present invention is not limited to a Static Var Compensator, and applicable to cascade-connection type power conversion devices in general. That is, the circuit configuration of the power conversion device 23 may be not only the cascade multilevel converter (CMC) shown in FIG. 2 but also a circuit configuration such as a modular multilevel converter (MMC) shown in FIGS. 7A and 7B.

Figures 7A, 7B:
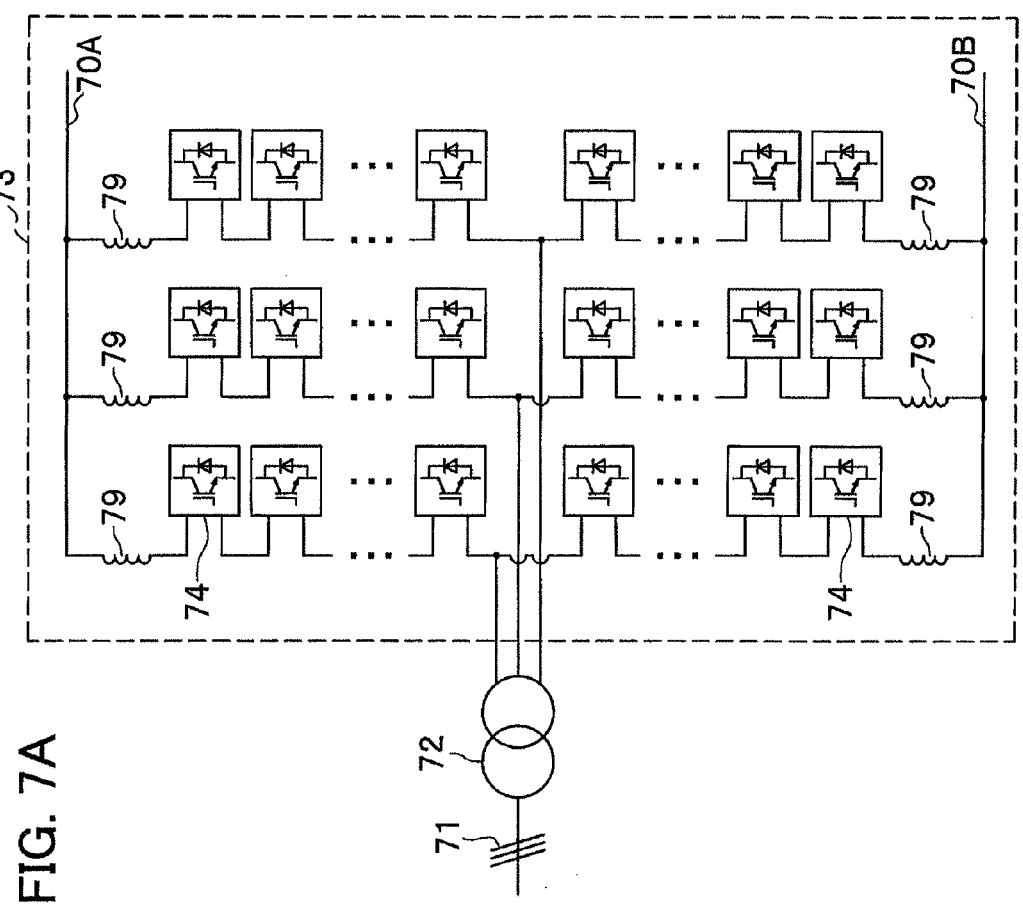
FIGS. 7A and 7B are diagrams showing a circuit configuration of a modular multilevel converter as a reference, where

FIGS. 7A and 7B are diagrams showing a configuration of a modular multilevel converter 73 as a reference, where FIG. 7A shows a schematic configuration of a modular multilevel converter 73, and FIG. 7B shows a circuit configuration of a cell 74 for use in FIG. 7A.

In FIG. 7A, the modular multilevel converter 73 is interconnected to a three-phase power system 71 via a transformer 72. The modular multilevel converter 73 is composed of two sets, top and bottom, of multilevel converter in FIG. 7A. In each of the multilevel converters, a plurality of cells 74, each of which is a single-phase power converter, are connected in series (cascade connection) respectively for each of a first to third arms, which constitute a three-phase arm, wherein one end of each of the first to third arms is connected to the secondary side of the transformer 72. Also, the other end of each of the first to third arms is connected to a common line 70A or common line 70B, respectively, via an AC reactor 79. In addition, the common line 70A and the common line 70B are DC-linked.

It should be noted that FIG. 7B shows a circuit configuration of the cell 74 for use in FIG. 7A as described above, which cell is composed of IGBTS 75, 76 and a DC capacitor 78.

The cell 24 in FIGS. 2 and 3, depicted as the first embodiment, may be provided with a storage battery in place of the DC capacitor 39 (FIG. 3). Likewise, the cell 24 in FIG. 7B may be provided with a storage battery in place of the DC capacitor 78.

Further, in the cell 24, a single-phase power converter, of the first embodiment, a converter portion of the main circuit 34 (FIG. 3) was described as configured with a full bridge circuit using IGBTS, but it is also possible to use a bidirectional chopper circuit instead of the full bridge circuit (main circuit 34). However, it is necessary to change a control circuit of the gate driver 33 (FIG. 3) to the one corresponding to the bidirectional chopper circuit.

Furthermore, in the cell 24, a single-phase power converter, of the first embodiment, a converter portion of the main circuit 34 was described as using a switching element consisting of the IGBTS, but it is also possible to use other switching element.

That is, a switching element for on-off control, such as a GTO (Gate-Turn-Off thyristor) and a MOSFET (Metal-Oxide Semiconductor Field-Effect Transistor) is also applicable.

Although not shown in FIG. 1, it is acceptable to include a checksum (Check Sum, one of error-detecting codes), CRC (Cyclic Redundancy Check), or the like in the control signal frame 8A (8B, 8C).

Further, in the control signal frame 8B of the second embodiment, the communication error diagnostic information signal was described as consisting of the communication error presence signal 12 and the communication error cell number 13, but other elements may be added to form the communication error diagnostic information signal. For example, it may be added with a cause of the error, severity, date and time, or the like in the form of a digital signal.

Furthermore, it was described that the power conversion device of the present embodiment in FIG. 2, controlled with the control signal frame 8A (8B, 8C) and the specific pattern 1 in FIG. 1, is used as a reactive power compensator, but its application is not limited thereto. By changing a control method of a signal, the power conversion device may be applicable to a power inverter or a power converter, and in such cases a method using the control signal frame 8A (8B, 8C) and the specific pattern 1 in FIG. 1 is effective.

Optical Serial Signal Frame as Comparative Reference

FIG. 6 is a diagram showing a configuration of an optical serial signal frame including a frame control signal 8D, as a comparative reference.

The control signal frame 8D in FIG. 6 includes a synchronization pattern 11. In addition, there is a "no signal" section 101, during which a signal is not transmitted, in the optical serial signal frame. The control signal frame 8D is configured, assuming that, due to not receiving a synchronization pattern 11 or inconsistency therebetween, a communication error of out-of-sync such as inability to transmit from the previous cell and disconnection of the optical fiber cable 25 (FIG. 2) has occurred.

However, as described above, there is a problem that, by including the synchronization pattern 11 in the control signal frame 8D in this way, a control signal frame 8D becomes longer, and a time required for its transmission (synchronization time) takes longer.

Supplement for Present Invention and Embodiment

The present embodiment is summarized that a power conversion device functioning as a reactive power compensator is configured with a plurality of single-phase power converters (cells) in cascade-connection, and a central control unit that controls the cells. Further, the central control unit and the plurality of the single-phase power converters (control units) are configured in a daisy-chain structure. Then, by constituting an optical serial signal frame, for controlling the plurality of the single-phase power converters, with a control signal frame and a specific pattern of signal that can be distinguished from the control signal frame, and by transmitting and receiving thereof, it is intended to determine communication errors.

With the configuration and method described above, the detection of communication errors such as inability to transmit from a control unit of each of the single-phase power converters and communication interruptions due to disconnection or short circuit of the optical fiber cable, or the like can be performed easily and at low cost, without increasing the length of the control signal frame.

The invention claimed is:

1. A power conversion device comprising:
a plurality of cascade-connection type single-phase power converters; and a first control unit that controls the plurality of single-phase power converters,
wherein, each of the plurality of the single-phase power converters has a second control unit, and
the first control unit and the plurality of the second control units are connected via a communication means having a daisy-chain configuration,
wherein, the second control unit transmits and receives a control signal via the communication means having the daisy-chain configuration, as well as a specific pattern signal, other than a control signal frame, which can be distinguished from the control signal frame, and determines a communication error due to not receiving the specific pattern signal at the second control unit, or an inconsistency between the received control signal and the specific pattern signal,
wherein the control signal includes a plurality of control signal frames, each having information specifying a single-phase power converter to be controlled and command values for controlling the single-phase power converter.

2. The power conversion device according to claim 1,
wherein the control signal includes a communication error diagnostic information signal for the communication error, and when the communication error is determined due to not receiving the specific pattern signal at the second control unit, or an inconsistency between the received control signal and the specific pattern signal, information about the communication error is included in the communication error diagnostic information signal.

3. The power conversion device according to claim 2,
wherein the communication error diagnostic information signal includes common information with another error diagnostic information signal caused by a different communication error.

4. The power conversion device according to claim 3,
wherein, when the communication error is determined due to not receiving the specific pattern signal at the second control unit, or an inconsistency between the received control signal and the specific pattern signal, information to identify the second control unit that determined the communication error, or a last second control unit which is connected in daisy chain with the second control unit that determined the communication error, is included in the communication error diagnostic information signal.

5. The power conversion device according to claim 2,
wherein, when the communication error is determined due to not receiving the specific pattern signal at the second control unit, or an inconsistency between the received control signal and the specific pattern signal, information to identify the second control unit that determined the communication error, or a last second control unit which is connected in daisy chain with the second control unit that determined the communication error, is included in the communication error diagnostic information signal.

6. The power conversion device according to claim 1,
wherein, when the communication error is determined due to not receiving the specific pattern signal at the second control unit, or an inconsistency between the received control signal and the specific pattern signal, switching elements of single-phase power converters, which are controlled by all second control units connected in daisy chain with the second control unit that determined the communication error, are turned off.

7. The power conversion device according to claim 2,
wherein, when the communication error is determined due to not receiving the specific pattern signal at the second control unit, or an inconsistency between the received control signal and the specific pattern signal, switching elements of single-phase power converters, which are controlled by the last second control unit connected in daisy chain with the second control unit that determined the communication error, are turned off.

8. The power conversion device according to claim 1,
wherein each single-phase power converter comprises:
a main circuit configured with switching elements for on-off control and a DC capacitor; and
a voltage sensor that detects a voltage across the DC capacitor, and the second control unit performs:
receiving a signal from the first control unit;
generating gate pulses for the switching elements for on-off control; and
transmitting a signal from the voltage sensor to the first control unit.

9. The power conversion device according to claim 1,
wherein each single-phase power converter comprises:
a main circuit configured with switching elements for on-off control and a DC capacitor; and
a voltage sensor that detects a voltage across the DC capacitor, and the second control unit performs:
receiving a signal from the first control unit;
generating gate pulses for the switching elements for on-off control; and
transmitting a signal from the voltage sensor to the first control unit, wherein the signal which the second control unit receives from the first control unit comprises
a control signal frame including:
a signal start mark;
a synchronized carrier number;
a series of signals composed of a subject cell number, a modulation factor signal and a voltage signal of the DC capacitor or a dummy signal for the voltage across the DC capacitor, both of which are appended with the subject cell number; and
a signal end mark, and the specific pattern signal that is composed of a pattern which can be distinguished from the control signal frame.

10. The power conversion device according to claim 1, wherein each single-phase power converter comprises:
a main circuit configured with switching elements for on-off control and a DC capacitor; and
a voltage sensor that detects a voltage across the DC capacitor, and the second control unit performs:
receiving a signal from the first control unit;
generating gate pulses for the switching elements for on-off control; and
transmitting a signal from the voltage sensor to the first control unit,
wherein the signal which the second control unit receives from the first control unit comprises
a control signal frame including:
a signal start mark;
a synchronized carrier number;
a series of signals composed of a subject cell number, a modulation factor signal and a voltage signal of the DC capacitor or a dummy signal for the voltage across the DC capacitor, both of which are appended with the subject cell number; and
a signal end mark,
and the specific pattern signal that is composed of a pattern which can be distinguished from the control signal frame,
wherein the control signal frame is transmitted from the first control unit at a substantially constant frequency.

11. A power conversion device comprising:
a plurality of cascade-connection type single-phase power converters; and
a first control unit that controls the plurality of single-phase power converters,
wherein, each of the plurality of the single-phase power converters has a second control unit, and the first control unit and the plurality of the second control units are connected via a communication means having a daisy-chain configuration,
wherein, the second control unit transmits and receives a control signal via the communication means having the daisy-chain configuration, as well as a specific pattern signal, other than a control signal frame, which can be distinguished from the control signal frame, and determines a communication error due to not receiving the specific pattern signal at the second control unit, or an inconsistency between the received signal and the specific pattern signal,
wherein the control signal includes:
a plurality of control signal frames, each having information of specifying a single-phase power converter to be controlled and command values for controlling the single-phase power converter;
a start information that precedes the plurality of control signal frames; and
an end information that follows the plurality of control signal frames, and
the specific pattern signal is provided between a given control signal and a next control signal so as to continuously follow the given control signal, and continuously precedes the next control signal,
wherein the plurality of cascade-connection type single-phase power converters are configured so that output voltages from respective single-phase power converters in each cascade connection are cumulatively added across one end of the cascade connection and another end of the cascade connection.

* * * * *